(12) United States Patent
Yamato

(10) Patent No.: US 10,419,353 B2
(45) Date of Patent: Sep. 17, 2019

(54) DATA-FLOW CONTROL DEVICE AND DATA-FLOW CONTROL METHOD

(71) Applicant: OMRON Corporation, Kyoto-shi, Kyoto (JP)

(72) Inventor: Tetsuji Yamato, Kyoto (JP)

(73) Assignee: OMRON Corporation, Kyoto-shi (JP)

( * ) Notice: Subject to any disclaimer, the term of this patent is extended or adjusted under 35 U.S.C. 154(b) by 0 days.

(21) Appl. No.: 16/083,863

(22) PCT Filed: Jan. 10, 2017

(86) PCT No.: PCT/JP2017/000399
§ 371 (c)(1),
(2) Date: Sep. 10, 2018

(87) PCT Pub. No.: WO2017/159005
PCT Pub. Date: Sep. 21, 2017

(65) Prior Publication Data
US 2019/0036830 A1 Jan. 31, 2019

(30) Foreign Application Priority Data
Mar. 15, 2016 (JP) .................. 2016-051464

(51) Int. Cl.
*H04L 12/851* (2013.01)
*G06Q 30/06* (2012.01)
(Continued)

(52) U.S. Cl.
CPC .......... *H04L 47/2483* (2013.01); *G06F 16/00* (2019.01); *G06Q 30/06* (2013.01);
(Continued)

(58) Field of Classification Search
CPC .... H04L 47/2483; H04L 67/303; H04W 4/38; H04W 4/70; H04W 4/40; G08G 1/0145; G06F 16/00; G06Q 30/06; H04M 11/00
See application file for complete search history.

(56) References Cited

U.S. PATENT DOCUMENTS 8,601,109 B2 * 12/2013 Johannsen ............ G06F 21/44
709/223
2008/0164997 A1 7/2008 Aritsuka et al.
(Continued)

FOREIGN PATENT DOCUMENTS

JP 2002-230339 A 8/2002
JP 2002230339 A * 8/2002
(Continued)

OTHER PUBLICATIONS

Written Opinion of PCT/JP2017/000399 dated Feb. 7, 2017.
(Continued)

*Primary Examiner* — Mohamed Barakat
(74) *Attorney, Agent, or Firm* — Metrolex IP Law Group, PLLC

(57) ABSTRACT

This data-flow control device has: a device-side metadata acquisition means that acquires device-side metadata about each of a plurality of devices; an application-side metadata acquisition means that acquires application-side metadata about an application that uses data provided by a device; a storage means that stores each type of metadata; a matching means that extracts a combination of an application and a device that can provide data satisfying the specification required by the application; and a data-flow control means that generates a data flow control command specifying a device and an application. If there is an item in which a mismatch has occurred among the items in each type of metadata, the matching means acquires information indicating whether changing the item in which a mismatch has occurred is allowed, and, on the basis of the information, changes the item in which a mismatch has occurred.

6 Claims, 9 Drawing Sheets

(51) Int. Cl.
  *H04M 11/00* (2006.01)
  *G06F 16/00* (2019.01)
  *H04W 4/38* (2018.01)
  *G08G 1/01* (2006.01)
  *H04L 29/08* (2006.01)
  *H04W 4/70* (2018.01)
  *H04W 4/40* (2018.01)

(52) U.S. Cl.
  CPC ......... *G08G 1/0145* (2013.01); *H04L 67/303* (2013.01); *H04M 11/00* (2013.01); *H04W 4/38* (2018.02); *H04W 4/40* (2018.02); *H04W 4/70* (2018.02)

(56) References Cited

U.S. PATENT DOCUMENTS

| | | | | |
|---|---|---|---|---|
| 2014/0372561 | A1* | 12/2014 | Hisano | G08G 1/0112 709/217 |
| 2016/0027299 | A1* | 1/2016 | Raamot | G08G 1/08 340/917 |
| 2016/0338142 | A1* | 11/2016 | Rune | H04W 76/28 |

FOREIGN PATENT DOCUMENTS

| | | | | |
|---|---|---|---|---|
| JP | 2003-346011 | A | | 12/2003 |
| JP | 2003346011 | A | * | 12/2003 |
| JP | 2007-300571 | A | | 11/2007 |
| JP | 2011-227694 | A | | 11/2011 |
| JP | 5445722 | B1 | | 3/2014 |
| WO | 2014-041826 | A1 | | 3/2014 |
| WO | 2014-068697 | A1 | | 5/2014 |
| WO | WO-2014068697 | A1 | * | 5/2014 ............ G06Q 10/02 |

OTHER PUBLICATIONS

English translation of the International preliminary report on patentability (IPRP) of PCT/JP2017/000399 dated Sep. 27, 2018.
International Search Report of PCT/JP2017/000399 dated Feb. 7, 2017.
Japanese Office Action of a counterpart Japanese application 2016-051464 dated May 22, 2018.
Japanese Office Action of a counterpart Japanese application 2016-051464 dated Jul. 24, 2018.

* cited by examiner

FIG. 2

(A) Sensor-side metadata table

| Sensor ID | Network address | Sensing target | Sensing place | Change | Sensing time | Change | Data type | Change | Use range | Change | Consideration | Change | Data history | Change |
|---|---|---|---|---|---|---|---|---|---|---|---|---|---|---|
| R001 | ... | Outside air | In front of Kyoto station | Unchangeable | 00:00~24:00 | Unchangeable | Temperature | Unchangeable | Business | Changeable | At least 100 yen | Unchangeable | aa1 produced by A company | Changeable |
| R002 | ... | Intersection | Tokyo, A intersection | Unchangeable | 00:00~24:00 | Unchangeable | Still image and moving image | Unchangeable | Business | Changeable | At least 100 yen | Unchangeable | xx1 produced by X company | Changeable |
| ... | ... | ... | ... | ... | ... | ... | ... | ... | ... | ... | ... | ... | ... | ... |
| V001 | ... | Passing vehicle | Tokyo, Road between A and B | Unchangeable | 00:00~24:00 | Unchangeable | Speed | Unchangeable | Unlimited | Changeable | At least 50 yen | Changeable | yy1 produced by Y company | Changeable |
| ... | ... | ... | ... | ... | ... | ... | ... | ... | ... | ... | ... | ... | ... | ... |

(B) Application-side metadata table

| Application ID | Network address | Sensing target | Sensing place | Change | Sensing time | Change | Data type | Change | Use range | Change | Consideration | Change | Data history | Change |
|---|---|---|---|---|---|---|---|---|---|---|---|---|---|---|
| A001 | ... | Intersection | Tokyo, A intersection | Unchangeable | 9:00 12:00 15:00 | Changeable | Still image | Unchangeable | Business | Unchangeable | 50 yen or less | Unchangeable | ... | Changeable |
| A002 | ... | Outside air | In front of Kyoto station | Unchangeable | 10:00 17:00 | Changeable | Temperature | Unchangeable | Business | Unchangeable | 200 yen or less | Unchangeable | aa1 produced by A company, aa2 produced by A company, bb1 produced by B company | Changeable |
| ... | ... | ... | ... | ... | ... | ... | ... | ... | ... | ... | ... | ... | ... | ... |

FIG. 3

| | | Changeability |
|---|---|---|
| | Sensor information input | |
| Sensor ID | R001 | |
| Network address | 10.45.55.11 | |
| Sensing target | Outside air | ☐ |
| Sensing place | In front of Kyoto station | ☐ |
| Sensing time | 00:00 – 23:59 | ☐ |
| Data type | Temperature | ☐ |
| Use range | Business | ☐ |
| Consideration | At least 100 yen | ☑ |
| Data history | xx1 produced by X company | ☐ |

Registration

FIG. 7

Date: March 1, 2016

From: Sensor network service

Subject: Notification of matching result

---

Although matching is performed on application ID of A001, mismatch is generated in a part of items.
The matching is established when the following item is changed.
(Consideration) 50 yen or less ⇒
(Consideration) 100 yen or less Please give approval in the following URL when the change is permitted Http://sensor-net.com/xxxxxxxxx FIG. 8  (A) Sensor-side metadata table

| Sensor ID | Network address | Sensing target | Sensing place | Change | Sensing time | Change | Data type | Change | Use range | Change | Consideration | Change | Data history | Change |
|---|---|---|---|---|---|---|---|---|---|---|---|---|---|---|
| R001 | ... | Outside air | In front of Kyoto station | Unchangeable | 00:00-24:00 | Unchangeable | Temperature | Unchangeable | Business | Unchangeable | At least 100 yen | Changeable | aa1 produced by A company | Changeable |
| R002 | ... | Intersection | Tokyo, A intersection | Unchangeable | 00:00-24:00 | Unchangeable | Still image and moving image | Unchangeable | Business | Unchangeable | At least 100 yen | Unchangeable | xx1 produced by X company | Changeable |
| ... | ... | ... | ... | ... | ... | ... | ... | ... | ... | ... | ... | ... | ... | ... |
| V001 | ... | Passing vehicle | Tokyo, Road between A and B | Unchangeable | 00:00-24:00 | Unchangeable | Speed | Unchangeable | Unlimited | Changeable | At least 50 yen | Changeable | yy1 produced by Y company | Changeable |
| ... | ... | ... | ... | ... | ... | ... | ... | ... | ... | ... | ... | ... | ... | ... |

(B) Application-side metadata table

| Application ID | Network address | Sensing target | Sensing place | Change | Sensing time | Change | Data type | Change | Use range | Change | Consideration | Change | Data history | Change |
|---|---|---|---|---|---|---|---|---|---|---|---|---|---|---|
| A001 | ... | Intersection | Tokyo, A intersection | Changeable | 9:00 12:00 15:00 | Changeable | Still image | Unchangeable | Business | Unchangeable | 50 yen or less, 75 yen or less, 100 yen or less | Changeable | --- | Changeable |
| A002 | ... | Outside air | In front of Kyoto station | Changeable | 10:00 17:00 | Changeable | Temperature | Unchangeable | Business | Unchangeable | 200 yen or less | Changeable | aa1 produced by A company, aa2 produced by A company, bb1 produced by B company | Changeable |
| ... | ... | ... | ... | ... | ... | ... | ... | ... | ... | ... | ... | ... | ... | ... |

DATA-FLOW CONTROL DEVICE AND DATA-FLOW CONTROL METHOD

TECHNICAL FIELD

The present invention relates to a technique of controlling a data flow that provides data obtained by a device such as a sensor to an application that uses the data.

BACKGROUND ART

An IT environment called M2M cloud currently attracts attention. Machine to Machine (M2M) indicates a system in which machines having various applications, sizes and performances exchange information over a network. Use of this information can properly control each machine, and analyze a status of a real world. Expectations for practical application are increasing due to improvement of wireless communication technology supporting M2M, miniaturization of a machine, cost reduction, and the like.

What is called M2M cloud is a technology that provides such an M2M technology on a cloud computing environment. A basic function necessary for M2M, such as data collection, accumulation, processing, and analysis, is provided as an application on the cloud, and is usable from anywhere. Reliability and coverage can be improved by collective management of data. For a user, there is an advantage that a required amount of collected data and computer resources can be used. Consequently, an added value can be obtained by analyzing big data without individually constructing a system, and application is expected in a wide range of fields.

As described in Patent Document 1, a technique called a sensor network is studied. Sensor devices (hereinafter, also simply referred to as a sensor) having a sensing function and a communication function are installed in various places, moving bodies, industrial facilities, and the like, and the sensor devices are networked, which allows collection, management, and seamless use of sensing data.

Usually, the sensor is installed to collect data required by an owner. For this reason, the sensor is not often used except when the owner collects the data (the sensor itself is not operated, or the sensing data is not used even if the sensor is operated). The sensing data has low distributability, and the sensing data is limited to the analysis and use by the sensor owner himself no matter how meaningful data for the third party. This leads to duplicate investment of facilities and network congestion by communication with sensors installed by each.

A technology called Internet of Things (IoT) is also studied. A new value is generated by combining pieces of information about many things existing in the world on the net, and seamless development of various services such as social infrastructure is expected. In order to create a value from IoT, it is necessary to know the state of things connected to the net, and sensing and communication are an important element technology.

PRIOR ART DOCUMENTS

Patent Documents

Patent document 1: Japanese Unexamined Patent Application Publication No. 2007-300571
Patent document 2: Japanese Patent No. 5445722

SUMMARY OF THE INVENTION

Problems to be Solved by the Invention

The applicant is extensively studying a technology for appropriately distributing information resource such as the sensing data in a sensor network. For example, a user who wants to provide the sensing data and a user who wants to use the sensing data are linked by appropriately matching data describing information about the sensor and data describing information about the application using the sensing data (see Patent Document 2).

Consequently, for example, the owner of the sensor can obtain a consideration by permitting the data user to temporarily use the sensor or providing the sensing data. For the user, investment for installing the sensor is unnecessary, so that there is an advantage that necessary data can be obtained at low cost.

In the invention described in Patent Document 2, the matching is performed using metadata corresponding to the sensor and metadata corresponding to the application using the sensing data, and a pair of the sensor and the application is generated. However, each piece of metadata includes a lot of pieces of attribute information such as attribute information about the sensor itself, attribute information about a sensing target, and attribute information about the sensing operation, the pair is not established unless the pieces of attribute information are completely matched. That is, there is a problem in that the sensor and the application are not connected depending on the number of pieces of registered metadata.

In order to solve the problem, in the case that an item disturbing the establishment of the pair exists, it is necessary to positively change the item.

Although the sensor network is described as an example, the same problem may arise even in a network that distributes data output (provided) by a device other than the sensor. Examples of the device other than the sensor include an actuator, a controller, a computer, a household electric appliance, a wearable terminal, an automatic ticket gate, a bender machine, and ATM as long as the device outputs some kind of data. In the description, the term "device" is used as a concept encompassing these devices (including the sensor), and a network through which the data output (provided) by the device is distributed is referred to as a device network. Various types of devices exemplified above may be mixed and connected in the device network.

The present invention has been made in view of the above circumstances, and an object of the present invention is to improve an establishment ratio of pairs in the device network that performs the matching of the data provider and the data user.

Means for Solving the Problem

A data-flow control device according to the present invention is characterized in that a unit that adjusting an item is provided when the item in which a conditions are not matched with each other as a result of the matching of the metadata.

Specifically, according to one aspect of the present invention, a data-flow control device includes: a device-side metadata acquisition unit that acquires device-side metadata including an item indicating a specification of data that can be provided by a device for each of a plurality of devices; an application-side metadata acquisition unit that acquires application-side metadata including an item indicating a specification of data requested by an application that uses the data provided by the device; a storage that stores the device-side metadata and the application-side metadata; a matching unit that performs matching between the application-side metadata and the device-side metadata to extract a combination of the application and a device capable of providing the data satisfying the specification required by the application; and a data-flow controller that generates a data-flow control command specifying the device and the application extracted by the matching unit. The matching unit extracts the combination based on whether matching target items are matched with each other among the items included in the device-side metadata and the application-side metadata, acquires information indicating whether an item in which a mismatch is generated is changeable when the item in which the mismatch is generated exists, and changes the item in which the mismatch is generated based on the information.

For example, the information indicating the changeability may be data previously set in each item, or may be generated based on an instruction of the user by making an inquiry to the user who registers the metadata.

According to this configuration, when the mismatch is generated between the items in the matching, the content of the item in which the mismatch is generated can individually be corrected to improve a probability of establishing the pair of the device and the application.

The matching unit may inquire a user who manages the device or the application whether to change the item in which the mismatch is generated, and change the item based on an answer acquired from the user.

For example, the inquiry may be made through e-mail or messaging service. According to this configuration, an opportunity for correcting the item can be provided to the user, and the user can determine whether the condition should be changed or skipped in order to establish the pair of the device and the application depending on the situation.

A flag indicating changeability may be associated with each of the matching target items included in the device-side metadata and the application-side metadata, and the matching unit may make an inquiry to the user when the item in which the mismatch is generated is changeable.

For example, in the case that the user thinks that the content of the item may be changed depending on the matching situation, the flag indicating changeability is added to the item, and a flag indicating "unchangeability is added to other items. According to this configuration, the number of unnecessary inquiries can be decreased to improve convenience of the user.

At least one change candidate may be associated with each of the matching target items included in the device-side metadata and the application-side metadata, and the matching unit may change the item based on the change candidate when the mismatch is generated between the items.

In this way, the item included in the metadata may include the change candidate, and the item may automatically be corrected. A plurality of change candidates may be provided. According to this configuration, necessity of making the inquiry to the user is eliminated, so that the pair of the device and the application can quickly be established.

The matching unit may not change the item when a number of items in which the mismatch is generated is greater than a predetermined number.

In the case that many mismatch items exist, it takes time to perform the adjustment, and there is a high possibility that the user finally goes away from the desired condition. For this reason, the adjustment itself may not be performed depending on the number of mismatch items.

The device may be a sensor that outputs the sensing data. The data-flow control device of the present invention can be suitably applied to a sensor network constructed with the data provider that provides the sensing data and the data user that uses the sensing data.

The present invention can be specified as a data-flow control device including at least a part of the above units. The present invention can also be specified as a device network system including the data-flow control device. The present invention can also be specified as a data-flow control method including at least a part of the pieces of above processing. The present invention can also be specified as a program causing a computer to perform the above method. The above pieces of processing and units can be freely combined and implemented as long as technical contradiction is not generated.

The device in the present invention means any device that outputs (provides) some kind of data, and examples of the device include a sensor, an actuator, a controller, a computer, a household electric appliance, a wearable terminal, an automatic ticket gate, a bender machine, and ATM. Among others, the present invention is suitable for a sensor network that distributes the sensing data output from the sensor.

Advantages of the Invention

According to the present invention, an establishment rate of pairs can be improved in the device network that performs the matching of the data provider and the data user.

BRIEF DESCRIPTION OF THE DRAWINGS

FIG. 2 is a view illustrating examples of sensor-side metadata and application-side metadata in the first embodiment.

FIG. 3 is a view illustrating an example of a screen that registers the sensor-side metadata.

FIG. 7 is view illustrating an example of a change request mail.

FIG. 8 is view illustrating examples of sensor-side metadata and application-side metadata in a second embodiment.

EMBODIMENT OF THE INVENTION

First Embodiment

Figure 1:
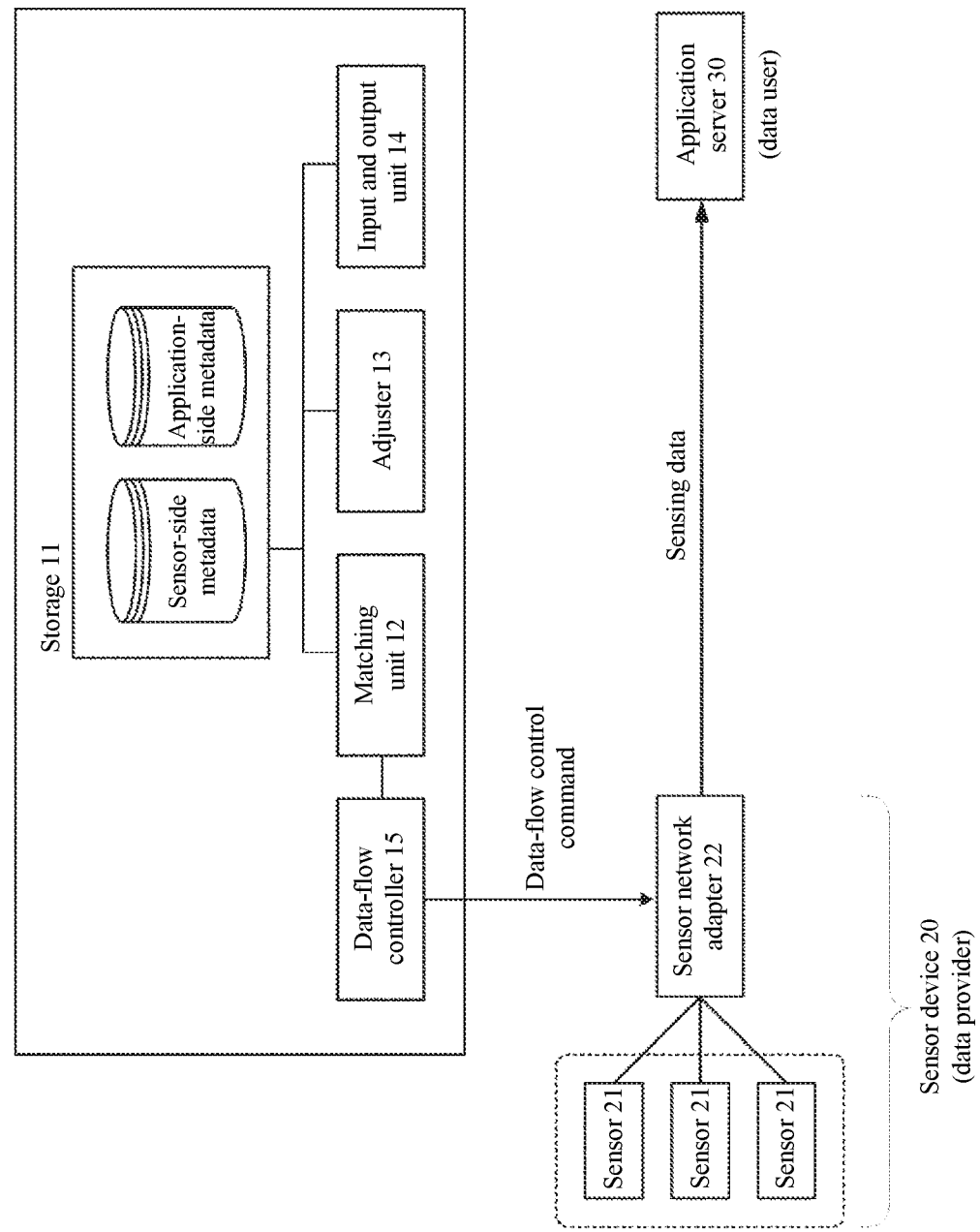
FIG. 1 is a block diagram illustrating a sensor network system according to a first embodiment.

Hereinafter, a preferred embodiment of the present invention will be described with reference to the drawings. The description of each component described below should be appropriately changed depending on a configuration of a system to which the present invention is applied and various conditions, and the scope of the present invention is not limited to the following description.

In the following embodiment, an example in which the present invention is applied to a sensor network system using M2M cloud will be described. When such a mechanism is constructed, anyone can easily acquire desired information from a variety of pieces of information obtained from a large number of sensors existing in a sensor network from anywhere, and effective use of the sensor (resource) and distribution of sensing data from a data provider to a data user are expected to be promoted. This system has various applications such as a traffic control system based on the sensing data of a traffic situation, a weather forecasting system based on the sensing data of an environment, various analysis system using big data, maintenance service of the sold sensor by a sensor manufacturer, and the like.

<Entire Configuration of System>

An entire configuration of a sensor network system according to a first embodiment of the present invention will be described with reference to FIG. 1. The sensor network system is a system that controls the distribution of the sensing data from the data provider to the data user. The sensor network system includes a sensor device 20 including a plurality of sensors 21 and a sensor network adapter 22 that is a device that manages the sensors 21, an application server 30 having an application that provides service using the sensing data, and a sensor network server 10 that is a data-flow control device that mediates between a provider of sensing data (hereinafter, referred to as a data provider) and a user (hereinafter, referred to as a data user). In the example, the sensor device 20 and the application server 30 are exemplified one by one, but a plurality of sensor devices 20 and a plurality of application servers 30 may be provided.

The devices are communicably connected to each other by a wide area network such as the Internet or a LAN. The network is not limited to a single network but may be considered as a conceptual one in which a plurality of networks having various communication schemes and topologies are connected to each other. That is, any form of network may be used as long as transmission and reception of the sensing data or transmission and reception of data such as metadata relating to the distribution of the sensing data and a data-flow control command can be provided.

<<Sensor>>

The sensor 21 detects a physical quantity to be sensed and a change in physical quantity, and outputs them as sensing data.

Examples of the sensor include an image sensor (such as a monitoring camera), a temperature sensor, a humidity sensor, an illuminance sensor, a force sensor, a sound sensor, an RFID sensor, an infrared sensor, a posture sensor, a rain sensor, a radiation sensor, a gas sensor, an acceleration sensor, a gyroscope, and a GPS sensor. Devices such as a mobile phone, a smart phone, a tablet terminal, a mobile PC, and a drone are equipped with various kinds of sensors, so that these devices can also be handled as a sensor. Any type of sensor including the exemplified sensors can be connected to the sensor network system of the embodiment. Many sensors have already been installed at every place in the world for various applications and purposes such as factory FA, production control, urban traffic control, meteorological environmental measurement, health care, and crime prevention, and these sensors can be connected to the sensor network system of the embodiment. The sensor network system may be constructed with only one type of sensor, or a plurality of types of sensors may be mixed in the sensor network system.

<<Sensor Network Adapter>>

The sensor network adapter 22 is connected to one or the plurality of sensors 21 so as to be able to communicate with the sensors 21 in a wired or wireless manner. The sensor network adapter 22 manages the sensor 21, acquires the sensing data from the sensor 21, and transmits the sensing data to the sensor network system or application. The sensor network adapter 22 may have a function of performing predetermined processing (for example, signal processing such as noise removal, a calculation such as averaging, sampling, data compression, and time stamp) on the sensing data. The sensor network adapter 22 has a function of communicating with an external device, and is capable of communicating with the application server 30, the sensor network server 10, and the like through a network.

Devices such as a smart phone, a tablet terminal, a mobile PC, a drone, and a wearable terminal are equipped with sensors such as an image sensor, a GPS sensor, an acceleration sensor, and a microphones, and have a function of processing and outputting data obtained by each sensor, and a network communication function. Thus, these devices are an example of a device in which the sensor 21 and the sensor network adapter 22 are physically integrated. In the case that the sensor 21 is equipped with a communication function, the sensor 21 can be connected to the sensor network system alone (that is, with no use of the sensor network adapter 22).

<<Application Server>>

The application server 30 is a server device in which various application programs providing service using the sensing data are installed. The application server 30 can be constructed with a general-purpose computer including a CPU (processor), a memory, an auxiliary storage device (HDD or the like), a communication device, an input device, and a display device. The application server 30 is installed by a user of the sensing data, and various applications are assumed according to use and purpose.

An application, in which a traffic jam map is generated by collecting a traffic condition at each point from the sensor installed on a road, an in-vehicle terminal mounted on a vehicle traveling on a road, or a smartphone of a driver, and provided to a business operator that uses traffic jam information, can be cited as an example of the application. A video distribution application that collects image data photographed during traveling with a smartphone or an in-vehicle camera and provides a situation at each point to the user, a traveling route search application that searches a traveling route of the vehicle based on the traffic jam information, an application that estimates statistical data of an attribute (such as gender and an age group) of a passer-by from video of a camera installed at specific locations and provides the statistical data as data for various surveys, and an application that a sensor makers performs on-line maintenance on the sold own sensor can also be cited as an example of the application.

<<Sensor Network Server>>

The sensor network server 10 is a server device that is responsible for matching between the provider of the sensing data and the user, data-flow control of the sensing data from the provider to the user, and the like. The sensor network server 10 is a specific example of the data-flow control device of the present invention. The sensor network server 10 can also be constructed with a general-purpose computer including a CPU (processor), a memory, an auxiliary storage device (HDD etc.), a communication device, an input device, and a display device. The CPU performs a necessary program to implement various functions of the sensor network server 10 (to be described later).

In the sensor network system, a large number (or various kinds of) sensors are networked to enable collection and use of sensing data. In the embodiment, it is assumed that the data provider (sensor 21) provides the sensing data to the data user (application server 30) to obtain a value. Consequently, the data provider obtains opportunities for revenue opportunities, and the user obtains acquisition of inexpensive data. The sensor network server 10 is a server device that mediates a transaction of the sensing data. The sensor network server 10 performs matching between the data provider and the data user to provide the proper distribution of the sensing data.

When the matching between the data provider and the data user is performed, it is not realistic to extract data matched with the desired condition of the data user from a huge amount of sensing data. For this reason, in this system, metadata (sensor-side metadata) describing the specifications, provision conditions and the like of the sensing data are prepared for all the sensors registered in the sensor network, and metadata (hereinafter, referred to as application-side metadata) describing a required specification, a use condition, and the like of the sensing data is used for applications that are the data user. The matching between the data provider (sensor) and the user (application) is properly performed by comparing the pieces of metadata to each other.

In the system configuration example of FIG. 1, the sensor network server 10 includes a storage 11, a matching unit 12, an adjuster 13, an input and output unit 14, and a data-flow controller 15.

The storage 11 is a database that storing the application-side metadata corresponding to all applications registered in the sensor network and the sensor-side metadata corresponding to all sensors registered in the sensor network.

The matching unit 12 performs the matching between the application-side metadata and the sensor-side metadata, which are registered in the storage 11, extracts the sensor capable of providing the sensing data satisfying an application request, and generates a pair of the sensor and the application (performs pairing).

In the case that an item interfering with the establishment of the pair is generated as a result of the matching processing performed by the matching unit, the adjuster 13 adjusts the content of the item (that is, determines whether to change, and makes a change based in a determination result).

Details of the matching unit 12 and the adjuster 13 will be described later.

The input and output unit 14 is interface means for acquiring the sensor-side metadata or the application-side metadata, which are a registration target. The input and output unit 14 is hardware that communicates with an external computer by wired or wireless connection. The input and output unit 14 may include a display device and a human interface device (such as a keyboard and a mouse). In this case, necessity of the communication with the external computer is eliminated. In either case, the information can be provided to the user through the input and output unit 14, and the information can be acquired from the user.

The data-flow controller 15 is a function of generating and transmitting a data-flow control command instructing the transmission of the sensing data based on the information output by the matching unit 12. Details of these functions will be described later.

<Sensor-Side Metadata>

The metadata stored in the storage 11 will be described in detail.

FIG. 2A illustrates an example of the sensor-side metadata stored in the storage 11 in a table form.

The sensor-side metadata is metadata describing attribute information about the sensor, information indicating a specification of the sensing data that the sensor can provide, information indicating the provision condition of the sensing data, and the like. For example, the attribute information about the sensor may include an ID identifying the sensor, a type of the sensor, a network address of the sensor, and an operation history of the sensor. For example, an IP address, a MAC address, and a Uniform Resource Identifier (URI) can be used as the network address. In the case that the sensor is connected to the network through the sensor network adapter 22, the network address of the sensor network adapter 22 may be set.

Examples of the information indicating the specification of the sensing data include a sensing target (that is, what to sense), a location and a region (for example, a position and a range) to be sensed, a sensing time (a time and a time zone at which the sensing data can be acquired), a data type (for example, an image, a moving image, and temperature) of the sensing data, a data format (for example, JPEG and text), a sensing condition (for example, a shutter speed, resolution, and a sampling period), and data reliability.

The information indicating the provision condition of the sensing data is information indicating the transaction condition desired by the data provider. Examples of the information indicating the provision condition of the sensing data include an ID identifying the data provider, a consideration (data providing price), and a usage range and a usage purpose (for example, commercial use unavailable, secondary available).

Information indicating the history of the sensing data (hereinafter, referred to as data history information) can be described in the sensor-side metadata. The data history information is information indicating derivation, details, a source, an origin, an identity, a history, establishment, a responsible person, etc. of the sensing data. Any kind of information may be used as the data history information as long as the information can become an objective material that determines accuracy, quality, reliability, safety, and the like of the sensing data.

<Application-Side Metadata>

FIG. 2B illustrates an example of the application-side metadata stored in the storage 11 in the table form.

The application-side metadata is metadata describing attribute information about the application, information indicating the specification (required specification) of the sensing data requested by the application, information indicating the use condition of the sensing data, and the like.

For example, the attribute information about the application may include an ID identifying the application, a type of the application, and a network address of the application. For example, an IP address, and a port number can be used as the network address. Examples of the information indicating the required specification of the sensing data include a sensing target, an area to be sensed, a sensing time, a data type of the sensing data, a data format, a sensing condition, and data reliability.

The information indicating the use condition is information indicating the transaction condition desired by the data user. Examples of the information indicating the use condition include an ID identifying the data user, a consideration (upper limit of utilization price of the data), and a use range and a use purpose.

The data history information can also be described in the application-side metadata. A content of the data history information is identical to that of the information described in the sensor-side metadata, so that the description will be omitted. However, the data history information about the provided sensing data is described in the sensor-side metadata, whereas the data history information requested by the application is described in the application-side metadata.

Thus, a plurality of pieces of data history information that permitted by the application can be described in the application-side metadata.

In the first embodiment, a field indicating changeability (hereinafter, referred to as a changeability flag) is added to each item of both the sensor-side metadata and the application-side metadata. In the example of FIG. 2A, a desired value of at least 50 yen is set in the sensor having the sensor ID of V001, and it is defined that the item is changeable. Details of the changeability flag will be described later.

<Registration of Metadata>

When the data provider or the data user wishes to provide or use the data, an own computer is connected to the sensor network server 10 to input the content of the metadata. Specifically, access to the input and output unit 14 is obtained through the network, and the information is input according to the screen generated by the input and output unit 14. Consequently, the sensor-side metadata or the application-side metadata is generated and stored in the storage 11. In this example, the data provider generates the sensor-side metadata. However, but the same holds true for the case that the data user generates the application-side metadata.

FIG. 3 illustrates an example of a screen that is displayed when the data provider newly registers the sensor-side metadata. The screen is generated by the input and output unit 14, and output to the computer of the data provider connected to the input and output unit 14.

In the first embodiment, the changeability is set in each item when the content of the metadata is input. "Changeable" indicates that the change of the content of the item is permitted when a mismatch is generate in the matching. That is, a concerned checkbox is turned on when there is room for consideration in the content of the item. For example, a consideration of at least 100 yen is set in the example of FIG. 3. However, the checkbox of changeable is turned on in the case that, for a great difference about the consideration, it is allowable to consider making it less than 100 yen.

When the user who inputs information presses the registration on the screen in FIG. 3, the sensor-side metadata is registered in the storage 11. At this point, a value (possible or impossible) is set to the changeability flag of each item according to the content of the checkbox of changeable.

<Matching Processing>

The matching is processing performed by the matching unit 12, and in processing of comparing the application-side metadata registered in the storage 11 to the sensor-side metadata registered in the storage 11, extracting items in which the conditions are matched with each other to pair with each other, and issuing a data-flow control command of the sensing data from the corresponding sensor to the application. The matching is performed when the metadata is newly registered.

Figure 4:
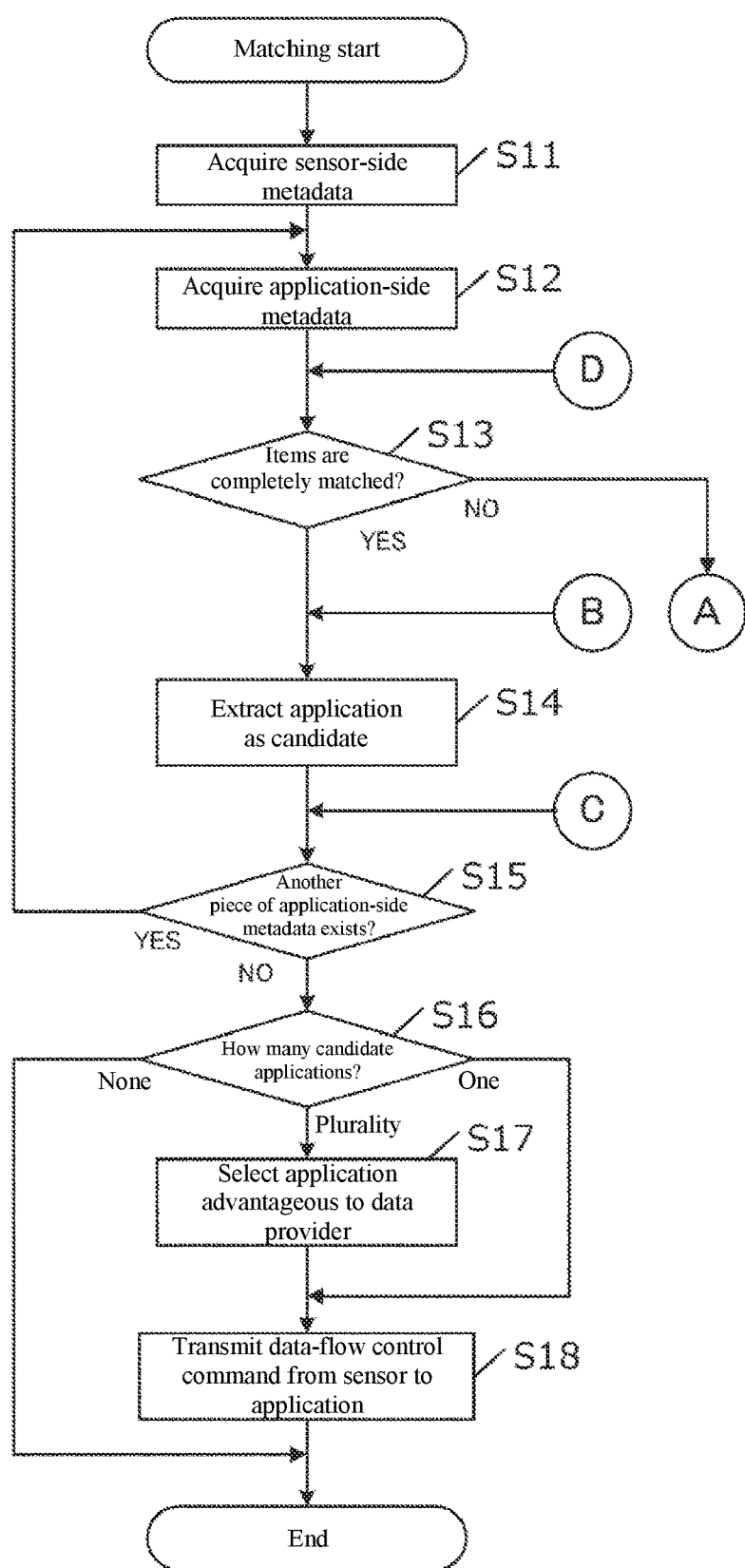
FIG. 4 is a flowchart of matching processing.

FIG. 4 is a flowchart illustrating matching processing that is performed when the sensor-side metadata is registered.

The sensor-side metadata waiting for the processing is acquired one by one from a sensor-side metadata table owned by the storage 11 (step S11).

One piece of application-side metadata is acquired from the application-side metadata table of the storage 11 (step S12).

Whether the specification and the transaction condition (provision condition) of the sensing data specified by the application-side metadata satisfy the request specification and the transaction condition (use condition) of the sensing data specified by the sensor-side metadata is determined. The pair is established when the comparison target items of the sensor-side metadata are matched with the comparison target items of the application-side metadata, but the pair is not established when the sensor-side metadata is not matched with the application-side metadata with respect to at least one comparison target item (step S13).

Whether the conditions are matched with each other is not necessarily determined by complete matching in wording. For example, when the sensing location is "in Kyoto city" on the sensor side and when the sensing location is "in front of Kyoto station" on the application side, it is determined that the sensing locations are matched with each other.

When items are not matched with each other in step S13 and the pair is not established, processing of correcting the item is tried. The processing will be described later with reference to FIG. 5.

When the pairing is established in step S13, the application-side metadata acquired in step S12 is extracted as one of the final pair candidates (step S14).

The pieces of processing in steps S12 to S14 are performed for all the pieces of application-side metadata registered in the application-side metadata table (step S15).

In step S16, the number of pieces of application-side metadata extracted as the candidate is determined.

When a plurality of pieces of application-side metadata extracted as the candidate exist, the matching unit 12 selects the most advantageous application-side metadata for the data provider from the plurality of pieces of application-side metadata (step S17). For example, for a consideration priority, the application-side metadata having the highest data price may be selected. What criteria the application most advantageous to the data provider is selected can appropriately be set.

For no application-side metadata extracted as the candidate, the processing may be ended, or the application-side metadata closest to the data specification, the transaction condition, or the data history information may be recommended. After a predetermined time elapses, the processing in FIG. 4 may be performed again.

Finally, the data-flow controller 15 generates the data-flow control command issuing the instruction to transmit the sensing data to the target sensor, and transmits the data-flow control command to the sensor 21 (or the sensor network adapter 22 that manages the sensor 21) (Step S18).

As illustrated in FIG. 1, the sensor network adapter 22 acquires the necessary sensing data from the sensor 21 based on the data-flow control command, and transmits the sensing data to the corresponding application server 30.

The data-flow control command includes a data-flow control command ID, information identifying the sensor (a sensor ID, a sensor network address), information identifying the application (an application ID, an application network address), and information about time the data is transmitted. However, the data-flow control command may include other pieces of information.

As described above, in order to establish the pair of the sensor and the application, it is necessary that all the comparison target items of the sensor-side metadata be matched with all the comparison target items of the application-side metadata. That is, in the case that the sensor-side metadata is not matched with the application-side metadata with respect to at least one item, the pair is not established, and sometimes an opportunity loss is generated for both the data provider and the data user. For this reason, in the first embodiment, a flag indicating the changeability is added to the comparison target item of the metadata, and the sensor network server 10 adjust the comparison target item based on information set in the field when the sensor-side metadata is not matched with the application-side metadata with respect to some comparison target items.

<Adjustment of Item>

Figure 5:
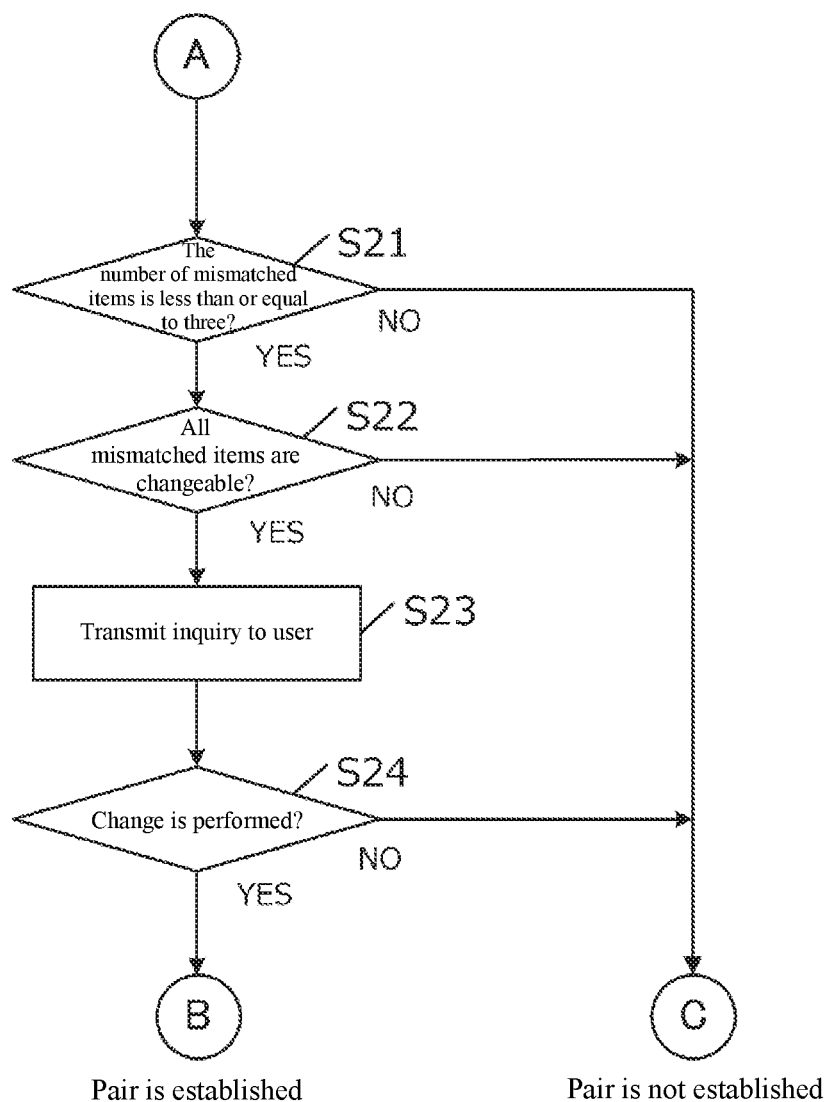
FIG. 5 is a flowchart of item correction processing.

In the first embodiment, in the case that all the comparison target items of the sensor-side metadata are not matched with all the comparison target items of the application-side metadata in step S13, the adjuster 13 takes over the processing, and performs the processing of adjusting the items that are not matched with each other. FIG. 5 is a flowchart illustrating the processing performed by the adjuster 13.

When a mismatch is generated in step S13, whether the number of mismatched items is less than or equal to a predetermined number (for example, three) is determined in step S21. When the number of mismatch items is less than the predetermined number, the processing transfers to step S22. On the other hand, when the number of mismatched items exceeds the predetermined number, it is determined that the adjustment is hardly performed, and the pair is not established. The predetermined number is an example, and any number may be used.

In step S22, whether all the changeability flags of the mismatched items are set to changeable in the sensor-side metadata or the application-side metadata. As a result, the processing transfers to step S23 when the affirmative determination is made, and the pair is not established when the negative determination is made.

Figure 6:
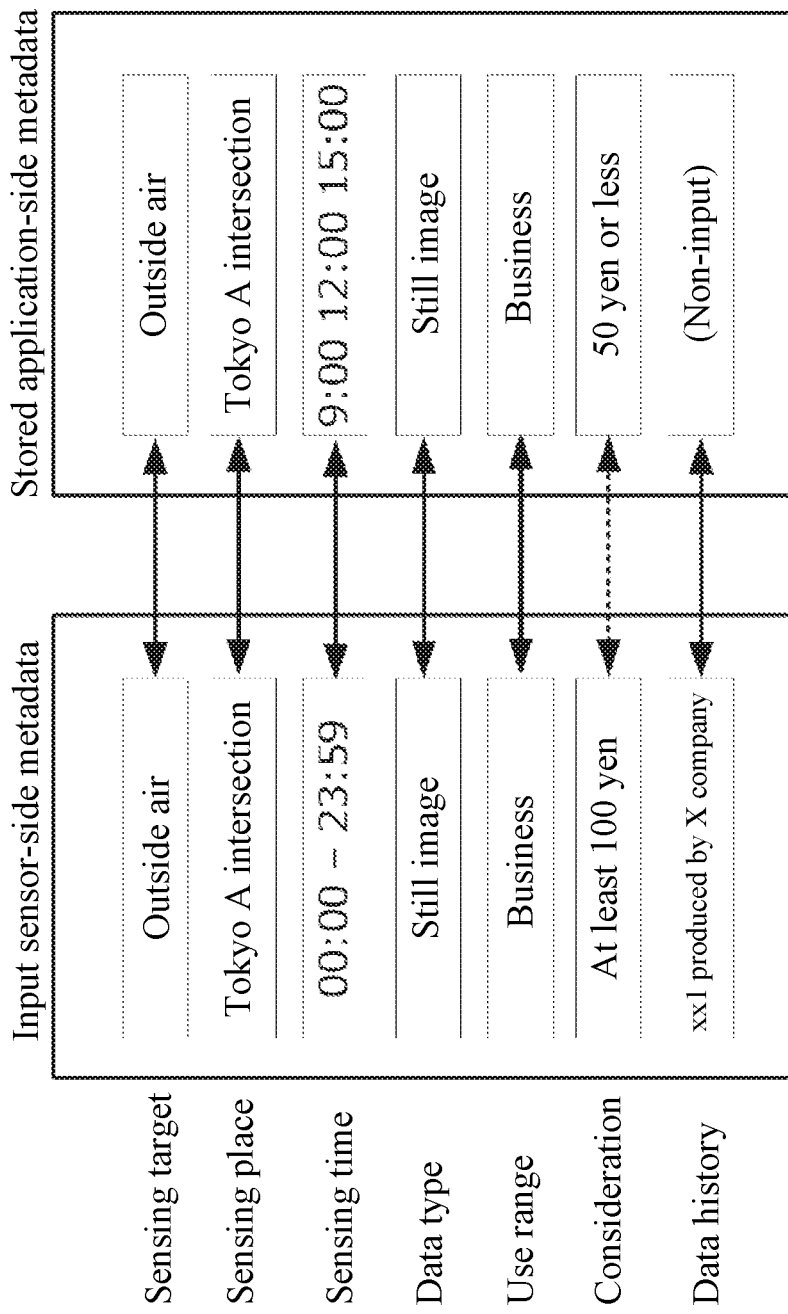
FIG. 6 is a view illustrating matching between pieces of metadata.

For example, in FIG. 2, the case that a sensor ID of R002 and an application ID of A001 are matched with each other. In the example of FIG. 2, the six items of the sensing location, the sensing time, the data type, the utilization range, the consideration, and the data history are items to be compared, so that only the considerations are not matched with each other as illustrated in FIG. 6.

On the other hand, changeable is set to the changeability flag included in the item of the consideration of the application-side metadata, so that the affirmative determination is made in step S22.

In step S23, the user is inquired whether the item to which changeable is set is changed in order to establish the pair. The inquiry is typically performed by e-mail, but other means may be used. For example, a sentence in FIG. 7 may be transmitted through e-mail or messaging service, and a reply may be acquired from the user through a Web server.

Only one item to be corrected is exemplified. However, in the case that a plurality of items to be modified exist, all the change contents are presented to the user, and the user is inquired whether the change for all the items is approved.

In step S24, an answer is acquired from the user to determine whether the change can be performed. For example, when the user's consent to change the consideration of 50 yen or less to 100 yen or less is obtained, the item is changed to 100 yen or less. In the case that agreement cannot be obtained (including the case that the reply is not obtained within the predetermined time), it is assumed that the pair is not established.

Consequently, the comparison target items are matched with each other, and therefore the pair is established.

As described above, in the sensor network server of the first embodiment, when the match item is generated as a result of the matching between the pieces of metadata, the user checks whether the item is changeable, and the item is automatically corrected based on the obtained answer such that the pair is established. Consequently, the establishment rate of the pair can be improved.

In the first embodiment, by way of example, the inquiry is made to the data-user side. However, the inquiry may be made to the data-provider side in the case that the changeable item exists only in the sensor-side metadata.

The inquiry may be made to either in the case that both the sensor-side metadata and the application-side metadata are changeable with respect to the item in which the mismatch is generated. For example, the inquiry may be made to the side that subsequently registers the metadata, or the inquiry may be made to the side that previously registers the metadata.

In the case that the mismatch is generated with respect to a plurality of items, a part of the items may be corrected by the sensor side and the rest may be corrected by the application side.

In the case that it is necessary to correct both the sensor-side metadata and the application-side metadata, the inquiry may be made to both the data provider and the data user. In this case, mutual users may be notified that they are waiting for the other party's approval. In the case that one of the approvals is not obtained, the other approval may be canceled.

Second Embodiment

In a second embodiment, the metadata is provided with a correction candidate for the changing item and the correction is automatically performed without making an inquiry to the user.

In the second embodiment, as illustrated in FIG. 8, a plurality of conditions can be set to each item of the metadata. For example, in the application ID of A001, three conditions of 50 yen or less, 75 yen or less, and 100 yen or less are set as the consideration. Each condition indicates a first choice, a second choice, and a third choice, and the first choice is usually used in the matching.

Figure 9:
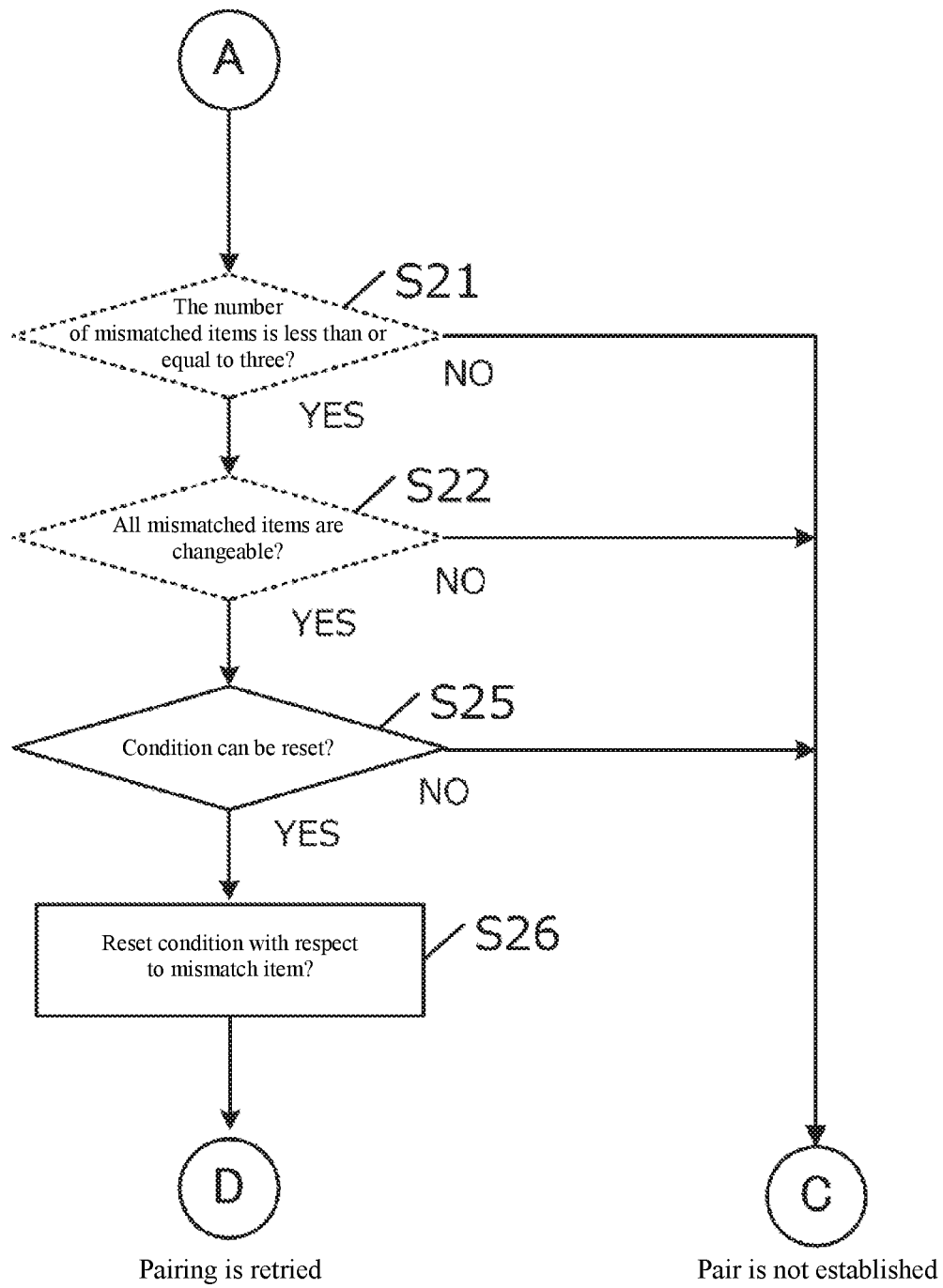
FIG. 9 is a flowchart of the item correction processing in the second embodiment.

FIG. 9 is a flowchart illustrating item correction processing in the second embodiment. Steps similar to those of the first embodiment are indicated by a dotted line, and the description will be omitted.

In the second embodiment, in the case that the mismatch is generated between the items, whether the item in which the condition can be reset exists is determined in step S25. For example, when the mismatch is generated as a result of the matching using the first choice, whether the second choice is set is determined, and the item is reset using the second choice (step S26). When the mismatch is generated as a result of the matching using the second choice, whether the third choice can be set is tried. The example of FIG. 9 is exemplified up to the third choice, but the number of choices is not limited. After resetting, step S13 is performed again and pairing is tried.

As described above, according to the second embodiment, for the normal matching, when the establishment of the pair is expected by correcting the items using a more favorable condition, the matching can automatically be retried while the condition is loosened. That is, the pair can promptly be established without making an inquiry to the user.

When the condition cannot be reset in step S25, it may be determined that the pair is not established as illustrated in FIG. 9. However, similarly to the first embodiment, the inquiry may be transmitted to the user and to check whether the condition that establishes the pair can be accepted.

In the second embodiment, by way of example, the application-side metadata is changed. Alternatively, the sensor-side metadata may be changed in the case that the changeable item exists only in the sensor-side metadata.

In the case that both the sensor-side metadata and the application-side metadata are changeable with respect to the item in which the mismatch is generated, either of them may be changed. For example, the metadata registered later may be changed.

In the case that the mismatch is generated in the plurality of items, a part may be changed by the sensor side and the rest may be changed by the application side.

The sensor-side metadata is not matched with the application-side metadata with respect to the plurality of items, and it is necessary to change both the sensor-side metadata and the application-side metadata. In this case, both the sensor-side metadata and the application-side metadata may be changed.

(Modifications)

The configuration of the above embodiment is merely one example of the present invention, but is not intended to limit the scope of the present invention. The present invention can adopt various concrete configurations without departing from the technical idea thereof. For example, the data structure and table structure of the above embodiment are an example, and the items may be added or replaced as appropriate.

In the description of the embodiments, the candidate of the other party metadata is selected based on the advantage for the data provider in step S17. However, the method is an example, and the candidate may be selected based on another condition.

In the description of the embodiment, by way of example, the matching processing in FIG. 4 is performed with the fact that the sensor-side metadata is newly registered as a trigger. However, the matching processing may be performed with the fact that the application-side metadata is newly registered as a trigger. In this case, the sensor and the application, and the data provider and the data user may be replaced. In the description of the embodiment, the matching processing is performed in timing of registering the metadata, but the matching processing may periodically be performed.

The sensor-side metadata and the application-side metadata in which the pair is established may be deleted from the storage 11, or a flag indicating that the contract is established is attached and the sensor-side metadata and the application-side metadata may be removed from the matching until the contract is canceled.

In the above embodiment, the distribution of the sensing data in the sensor network is exemplified. The present invention is also applicable to the distribution of the data in a device network including a device other than the sensor. Also in that case, the basic configuration of the system is similar to that of the above embodiment, and the sensor in the above embodiment may be read as the device and the sensing data may be read as the data.

The technical idea disclosed in the description can also be specified as the following invention.

(Additional Remark 1)

A data-flow control device including a memory and at least one hardware processor, the memory includes: a device-side metadata storage that stores device-side metadata including an item indicating a specification of data that can be provided by a device for each of a plurality of devices; and an application-side metadata storage that stores application-side metadata including an item indicating a specification of data requested by an application with respect to an application that uses the data provided by the device, and the at least one hardware processor performs matching between the application-side metadata and the device-side metadata to extract a combination of the application and a device capable of providing the data satisfying the specification required by the application, generates a data-flow control command specifying the extracted device and application, and in the extraction, extracts the combination based on whether matching target items are matched with each other among the items included in the device-side metadata and the application-side metadata, acquires information indicating whether an item in which a mismatch is generated is changeable when the item in which the mismatch is generated exists, and changes the item in which the mismatch is generated based on the information.

(Additional Remark 2)

A data-flow control method causing at least one hardware processor to perform: a device-side metadata acquisition step of acquiring device-side metadata including an item indicating a specification of data that can be provided by a device for each of a plurality of devices;

an application-side metadata acquisition step of acquiring application-side metadata including an item indicating a specification of data requested by an application with respect to an application that uses the data provided by the device;

a storage step of storing the device-side metadata and the application-side metadata;

a matching step of performing matching between the application-side metadata and the device-side metadata to extract a combination of the application and a device capable of providing the data satisfying the specification required by the application; and a data-flow control step of generating a data-flow control command specifying the device and the application extracted by the matching unit, wherein in the matching step, the combination is extracted based on whether matching target items are matched with each other among the items included in the device-side metadata and the application-side metadata, information indicating whether an item in which a mismatch is generated is changeable is acquired when the item in which the mismatch is generated exists, and the item in which the mismatch is generated is changed based on the information.

DESCRIPTION OF REFERENCE SIGNS

10: sensor network server
11: storage
12: matching unit
13: adjuster
14: input and output unit
15: data-flow controller
20: sensor device
21: sensor
22: sensor network adapter
30: application server

The invention claimed is:

1. A data-flow control device comprising:
a memory; and
at least one processor connected to the memory,
wherein the processor is configured to perform operations comprising:
acquiring device-side metadata including an item indicating a specification of data that can be provided by a device for each of a plurality of devices;
acquiring application-side metadata including an item indicating a specification of data requested by an application that uses the data provided by the device;

storing the device-side metadata and the application-side metadata in the memory;

performing matching between the application-side metadata and the device-side metadata to extract a combination of an application and a device capable of providing the data satisfying the specification required by the application; and generating a data-flow control command specifying the extracted device and the extracted application, wherein a flag indicating changeability is associated with each of the matching target items included in the device-side metadata and the application-side metadata, and the processor is configured to perform operations such that performing matching comprises:

extracting the combination based on whether matching target items are matched with each other among the items included in the device-side metadata and the application-side metadata;

generating a device-side user inquiry and an application-side user inquiry whether to change the item in which the mismatch is generated when the item in which the mismatch is generated exists and the flags indicate that the item in which the mismatch is generated is changeable; and changing the item in which the mismatch is generated based on answers acquired in response to the device-side user inquiry and the application-side user inquiry.

2. The data-flow control device according to claim 1, wherein the processor is configured to perform operations such that performing matching further comprises not changing the item when a number of items in which the mismatch is generated is greater than a predetermined number.

3. The data-flow control device according to claim 1, wherein the device comprises a sensor that outputs sensing data.

4. The data-flow control device according to claim 2, wherein the device comprises a sensor that outputs sensing data.

5. A data-flow control method, comprising:

acquiring device-side metadata including an item indicating a specification of data that can be provided by a device for each of a plurality of devices;

acquiring application-side metadata including an item indicating a specification of data requested by an application that uses the data provided by the device;

storing the device-side metadata and the application-side metadata;

performing matching between the application-side metadata and the device-side metadata to extract a combination of an application and a device capable of providing the data satisfying the specification required by the application; and generating a data-flow control command specifying the device and the application extracted in the matching, wherein a flag indicating changeability is associated with each of the matching target items included in the device-side metadata and the application-side metadata, and the matching comprises:

extracting the combination based on whether matching target items are matched with each other among the items included in the device-side metadata and the application-side metadata;

generating a device-side user inquiry and an application-side user inquiry whether to change the item in which the mismatch is generated when the item in which the mismatch is generated exists and the flags indicate that the item in which the mismatch is generated is changeable; and changing the item in which the mismatch is generated based on answers acquired in response to the device-side user inquiry and the application-side user inquiry, and the method is performed by a computer.

6. A non-transitory computer readable medium storing a program configured to cause a computer to perform operations comprising:

acquiring device-side metadata including an item indicating a specification of data that can be provided by a device for each of a plurality of devices;

acquiring application-side metadata including an item indicating a specification of data requested by an application that uses the data provided by the device;

storing the device-side metadata and the application-side metadata;

performing matching between the application-side metadata and the device-side metadata to extract a combination of an application and a device capable of providing the data satisfying the specification required by the application; and generating a data-flow control command specifying the device and the application extracted in the matching, wherein a flag indicating changeability is associated with each of the matching target items included in the device-side metadata and the application-side metadata, and the matching comprises:

extracting the combination based on whether matching target items are matched with each other among the items included in the device-side metadata and the application-side metadata;

generating a device-side user inquiry and an application-side user inquiry whether to change the item in which the mismatch is generated when the item in which the mismatch is generated exists and the flags indicate that the item in which the mismatch is generated is changeable; and changing the item in which the mismatch is generated based on answers acquired in response to the device-side user inquiry and the application-side user inquiry.

* * * * *